United States Patent [19]

Nakamura et al.

[11] Patent Number: 6,083,474
[45] Date of Patent: Jul. 4, 2000

[54] LITHIUM-IRON OXIDE PARTICLES AND PROCESS FOR PRODUCING THE SAME

[75] Inventors: Tatsuya Nakamura, Hiroshima; Ryoji Kanno, Kobe; Mikio Takano, Kyoto, all of Japan

[73] Assignee: Toda Kogyo Corporation, Hiroshima, Japan

[21] Appl. No.: 08/916,330

[22] Filed: Aug. 22, 1997

[30] Foreign Application Priority Data

| | | | |
|---|---|---|---|
| Aug. 23, 1996 | [JP] | Japan | ................................. 8-241145 |
| Aug. 23, 1996 | [JP] | Japan | ................................. 8-241146 |
| Aug. 23, 1996 | [JP] | Japan | ................................. 8-241147 |

[51] Int. Cl.$^7$ .................................................. C01B 13/14
[52] U.S. Cl. ........................ 423/592; 423/594; 423/599; 423/600; 429/218.1; 429/221; 429/223; 429/224; 502/325; 502/330
[58] Field of Search .................................... 502/325, 330; 252/62.56, 62.61; 423/519, 594, 592; 429/221, 223, 224, 218.1

[56] References Cited

U.S. PATENT DOCUMENTS

| | | | |
|---|---|---|---|
| 3,558,493 | 1/1971 | Wickham . | |
| 3,609,084 | 9/1971 | Loye | ..................................... 252/62.59 |
| 4,464,447 | 8/1984 | Lazzari et al. | ........................... 429/194 |
| 4,770,960 | 9/1988 | Nagaura et al. . | |
| 5,264,201 | 11/1993 | Dahn et al. | .............................. 423/594 |
| 5,316,875 | 5/1994 | Murai et al. | ............................. 429/194 |
| 5,342,711 | 8/1994 | Tamura et al. . | |
| 5,358,805 | 10/1994 | Fujimoto et al. . | |
| 5,503,930 | 4/1996 | Maruyama et al. . | |
| 5,789,110 | 8/1998 | Saidi et al. . | |

FOREIGN PATENT DOCUMENTS

| | | |
|---|---|---|
| 0 243 926 | 11/1987 | European Pat. Off. . |
| 0 728 702 A1 | 8/1996 | European Pat. Off. . |
| 2 022 012 | 11/1970 | Germany . |
| 56-103869 | 8/1981 | Japan . |
| 5-205743 | 8/1993 | Japan . |
| 8-287914 | 1/1996 | Japan . |
| 8-78004 | 3/1996 | Japan . |

OTHER PUBLICATIONS

Sakurai et al. Low Temperature Synthesis and Electrochemical Characteristics of LiFeO2 Cathodes. Journal of Power Sources 68 (1997) 711–715, 1996.

Kanno et al. Synthesis and Electrochemical Properties fo Lithium Iron Oxides with Layer–related Structures. Journal of Power Sources 68 (1997) 145–152, 1996.

Kanno et al J. Electrochem. Soc., vol. 143, No. 8, Aug. 1996 pp. 2435–2442 The Electrochemical Society, Inc. "Synthesis, Structure, and Electrochemical Properties of a New Lithium Iron Oxide etc."

Fernandez–Rodrigues: J Materials Science vol. 23, 1988 pp. 2971–2974 "Synthesis and alteration of alpha–LiFeO$_2$" etc.

*Primary Examiner*—Tom Dunn
*Assistant Examiner*—Cam N. Nguyen
*Attorney, Agent, or Firm*—Nixon & Vanderhye P.C.

[57] ABSTRACT

There are disclosed lithium-iron oxide particles having an excellent properties such as electrochemical reversibility and suitable as a material for cathode active material for lithium ion batteries, which have a corrugated layer crystal structure and are represented by the general formula (1):

$$Li_x(Fe_{(1-y)}M_y)O_2 \qquad (1)$$

wherein x is more than 0 and not more than 1; y is 0.005 to 0.1; and M is at least one metal selected from the group consisting of Co, Ni, Mn and Al.

9 Claims, 7 Drawing Sheets

LITHIUM-IRON OXIDE PARTICLES AND PROCESS FOR PRODUCING THE SAME

BACKGROUND OF THE INVENTION

The present invention relates to lithium-iron oxide particles and a process for producing the lithium-iron oxide particles, and more particularly to lithium-iron oxide particles suitable as a cathode active material used in lithium ion batteries, which particles have a corrugated layer structure and a high crystallinity, and are excellent in electrochemical reversibility, and a process for producing such lithium-iron oxide particles.

In recent years, in association with developments of personal computers and portable equipment such as portable phones, there have been an increasing demand for batteries as a power source therefor. Especially, a lot of studies for lithium ion batteries have been made in various fields because lithium is expected to provide high energy density batteries having a light weight due to a small atomic weight of lithium and a high electromotive force due to a high ionization energy of lithium.

In addition, recently, as a cathode active material usable in lithium ion batteries, $Li_xCoO_2$, $Li_xNiO_2$ or the like have been earnestly studied because these substances can generate a high voltage. Among them, $Li_xCoO_2$ has been already put to practical use. However, since the Co- or Ni-containing compounds such as $Li_xCoO_2$ or $Li_xNiO_2$ are expensive and Co or Ni are elements which are relatively less in production, the use of these compounds as a material for the as a cathode active material is not economical.

For this reason, as an economical material for as a cathode active materials, attention has been paid to lithium compound particles which have such a structure that Co or Ni of the afore-mentioned Co- or Ni-containing compounds is replaced with other transition elements, that is, lithium-iron compound particles, because Fe is not only inexpensive but also readily and extensively available.

Further, in the case of lithium ion batteries using lithium-iron oxide, lithium ions are repeatedly electrochemically introduced into and removed from ion sites in the lithium-iron oxide. However, when the lithium-iron oxide suffers from change in crystal structure, ion sites capable of receiving lithium ions or conduction paths for lithium ions in the crystal are apt to be dissipated, thereby causing deterioration in electrochemical reversibility of the lithium ion battery. Therefore, it is strongly demanded to enhance a crystallinity of the material for as a cathode active material.

$Li_xCoO_2$ or $Li_xNiO_2$ known as a material for as a cathode active material have a layered rock salt-type ($\alpha$-$NaFeO_2$ type) crystal structure. As other compounds than $Li_xCO_2$ and $Li_xNiO_2$ which have such a layered rock salt-type crystal structure, only $Li_xVO_2$ and $Li_xCrO_2$ have been known at present.

In the case of a high temperature-synthesizing process which process comprises calcining mixed particles of iron oxide and a lithium compound at a temperature of about 800° C., the obtained lithium-iron compound particles have a disordered tetragonal rock salt-type crystal structure. On the other hands, in the case of a low temperature-synthesizing process which comprises calcining mixed particles of iron oxide and a lithium compound at a temperature of about 400° C. to 500° C., the obtained lithium-iron compound particles have an ordered tetragonal crystal structure. However, any of the thus-produced lithium-iron compound particles could not act as a cathode active material for lithium ion batteries.

One of the present inventors has already produced, as a material for as a cathode active material usable in lithium ion batteries, lithium-iron oxide particles represented by the formula of $Li_xFeO_2$, which have a corrugated layer structure similar to the crystal structure of known $Li_xMnO_2$ ("Proceeding of the 36th Battery Symp. in Japan", pages 23–24, 1995).

However, the $Li_xFeO_2$ particles having a corrugated layer structure is unsatisfactory in crystallinity thereof, thereby causing a problem that an electrochemical reversibility of the particles is deteriorated.

The problem concerning the deterioration in electrochemical reversibility is explained in derail below.

The $Li_xFeO_2$ having a corrugated layer structure is formed by an ion exchange reaction between protons contained in $\gamma$-FeOOH and lithium ions. When the ion exchange reaction is conducted at an elevated temperature, $\alpha$-$Li_xFeO_2$ is improperly produced as a high temperature-stable phase. Therefore, it is necessary to conduct the ion exchange reaction at a temperature as low as not more than 350° C. However, when the ion exchange reaction is conducted at such a low temperature, the obtained $Li_xFeO_2$ has a low crystallinity and, therefore, the crystal structure thereof tend to become unstable. If lithium ions are repeatedly electrochemically introduced into and removed from the ion sites in $Li_xFeO_2$ having such an unstable crystal structure, the crystal structure located in proximity of the ion sites undergoes unsuitable change, so that there arises the afore-mentioned problem that the electrochemical reversibility of $Li_xFeO_2$ is deteriorated.

In addition, the $Li_xFeO_2$ particles having a corrugated layer structure have a low electronic conductivity and a small diffusion coefficient of lithium ions between the respective layers thereof. In the case where the $Li_xFeO_2$ particles are used as an electrode material for a lithium ion battery, there is caused a problem that the electrode reaction speed in the battery is low, so that the electric current operated by the battery becomes small.

On the other hand, at present, the demanded materials for as a cathode active materials are lithium-iron oxide particles which can show a good stability with the passage of time and can be readily handled. However, the afore-mentioned lithium-iron oxide particles having a corrugated layer structure tend to undergo unsuitable change in crystal structure with the passage of time so as to be transformed into lepidocrocite, thereby also causing a problem that a satisfactory activity required as a cathode active material for lithium ion battery cannot be attained.

For this reason, when such lithium-iron oxide particles are used as a material for as a cathode active material used in lithium ion batteries, sufficient care must be taken upon handling thereof.

As a result of earnest studies by the present inventors, it has been found that by heating a mixture of lepidocrocite particles containing at least one metal selected from the group consisting of cobalt, nickel, manganese and aluminum, and a lithium compound at a temperature of 100 to 150° C., lithium-iron oxide particles produced have a corrugated layer crystal structure and an excellent electrochemical reversibility, and are suitable as a cathode active material used in lithium ion batteries. The present invention has been accomplished on the basis of this finding.

SUMMARY OF THE INVENTION

It is an object of the present invention to provide lithium-iron oxide particles having a corrugated layer structure suitable for acting as a cathode active material for lithium ion batteries and a high crystallinity capable of realizing as high an electrode reaction speed as possible when used as a cathode active material for lithium ion batteries.

It is another object of the present invention to provide lithium-iron oxide particles having a corrugated layer structure, which is free from unsuitable change in its crystal structure even when allowed to stand in an atmosphere for a long period of time, i.e., can show an excellent storage stability.

To accomplish the aims, in a first aspect of the present invention, there are provided lithium-iron oxide particles having a corrugated layer crystal structure and represented by the general formula (1):

$$\text{Li}_x(\text{Fe}_{(1-y)}\text{M}_y)\text{O}_2 \quad (1)$$

wherein x is more than 0 and not more than 1; y is 0.005 to 0.1; and M is at least one metal selected from the group consisting of Co, Ni, Mn and Al.

In a second aspect of the present invention, there are provided lithium-iron oxide particles having a corrugated layer crystal structure and represented by the general formula (2):

$$\text{Li}_x(\text{Fe}_{(1-y)}\text{Al}_y)\text{O}_2 \quad (2)$$

wherein x is more than 0 and not more than 1; y is 0.005 to 0.1.

In a third aspect of the present invention, there is provided a process for producing lithium-iron oxide particles as defined in the first aspect, which comprises the step of heating mixed particles of lepidocrocite particles containing at least one metal selected from the group consisting of cobalt, nickel, manganese and aluminum, and lithium compound particles, at a temperature of 100 to 150° C.

In a fourth aspect of the present invention, there is provided a process for producing lithium-iron oxide particles as defined in the first aspect, which comprises the steps of heating mixed particles of lepidocrocite particles containing at least one metal selected from the group consisting of cobalt, nickel, manganese and aluminum, and lithium compound particles, at a temperature of 100 to 150° C., and after drying the obtained product, heat-treating the dried product at a temperature of 100 to 250° C.

In a fifth aspect of the present invention, there is provided a process for producing the lithium-iron oxide particles having a corrugated layer crystal structure and represented by the general formula (3):

$$\text{Li}_x\text{FeO}_2 \quad (3)$$

wherein x is more than 0 and not more than 1, which comprises the steps of heating mixed particles of lepidocrocite particles and lithium compound particles at a temperature of 100 to 150° C., and after drying the obtained product, heat-treating the dried product at a temperature of 100 to 250° C.

DETAILED DESCRIPTION OF THE INVENTION

Figure 1:
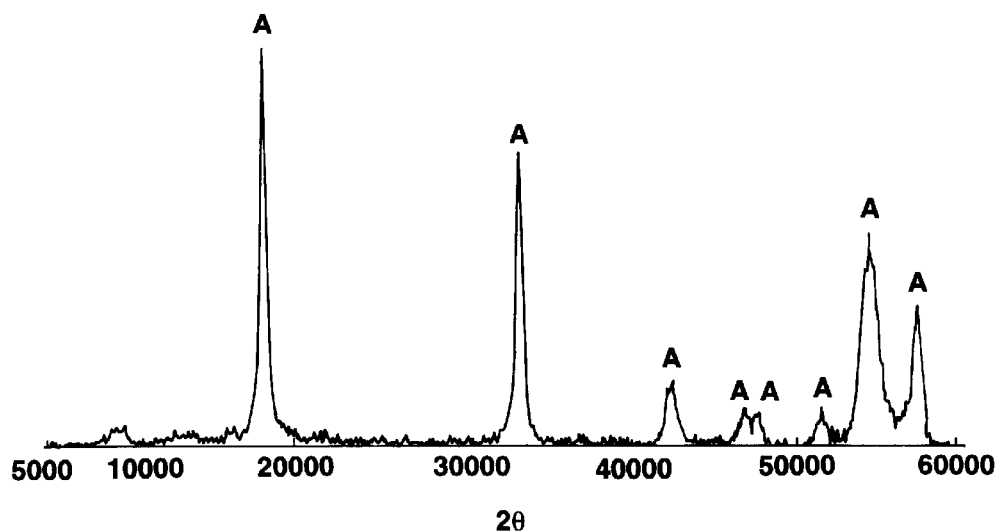
FIG. 1 is a graph showing an X-ray diffraction pattern of lithium-iron oxide obtained in Example 1.

First, the lithium-iron oxide particles according to the present invention are described.

The lithium-iron oxide particles according to the present invention contain at least one metal selected from the group consisting of cobalt, nickel, manganese and aluminum in the total amount of 0.5 to 10.0 mol % (calculated as Co, Ni, Mn and Al) based on Fe. When the total amount of the one or more metals is less than 0.5 mol %, it is impossible to obtain the aimed lithium-iron oxide particles which are capable of generating a high electromotive force, are excellent in an electrochemical reversibility of lithium ions and have a large diffusion coefficient of lithium ions. On the other hand, when the total amount of the one or more metals is more than 10.0 mol %, the obtained lithium-iron oxide particles can produce the required high electromotive force. However, in view of economy, the use of such an excess amount of the metal is meaningless because further increase in electromotive force cannot be expected.

Since the lithium-iron oxide particle according to the present invention has a corrugated layer structure, especially, when used as a material for an electrode active material in lithium ion batteries, the lithium-iron oxide particles can properly act as the electrode active material in the lithium ion batteries, so that a good electrochemical reversibility of lithium ions can be attained.

The lithium-iron oxide particles according to the present invention can be produced by the ion exchange reaction of protons contained between respective layers of a corrugated layer structure of lepidocrocite, with lithium ions contained in a lithium compound. The composition of the lithium-iron oxide is represented by the formula of $\text{Li}_x(\text{Fe}_{(1-y)}\text{M}_y)\text{O}_2$ (wherein $0<x \leq 1$, $0.005 \leq y \leq 0.1$, and M is at least one metal selected from the group consisting of Co, Ni, Mn and Al). In electrolytes having an ionic conductivity for lithium ions, the lithium-iron oxide particles exist as a substance having a composition of $\text{Li}_x(\text{Fe}_{1-y}\text{M}_y)\text{O}_2$ (wherein $0<x \leq 1$, $0.005 \leq y \leq 0.1$, and M is at least one metal selected from the group consisting of Co, Ni, Mn and Al), since the lithium ions are electrochemically introduced into and removed from lithium-iron oxide.

The particle size of the lithium-iron oxide particles according to the present invention may be substantially the same as the particle size of lepidocrocite particles used as a raw iron oxide material. The average particle size of the lithium-iron oxide particles is in the range of about 0.01 to about 1.0 μm, preferably 0.1 to 1.0 μm.

It is preferred that the lithium-iron oxide particles having a corrugated layer structure according to the present invention, are used as a cathode active material for lithium ion batteries.

In the case where the metal M is aluminum, the obtained lithium-iron oxide particles have a corrugated layer structure with a higher crystallinity, and therefore, are more suitable as a cathode active material used in lithium ion batteries.

Especially, in the case where the lithium-iron oxide particles having a corrugated layer structure according to the present invention are particles represented by the formula of $Li_x(Fe_{(1-y)}Al_y)O_2$ (wherein $0<x\leq1$ and $0.005\leq y\leq0.1$) and containing aluminum in an amount of 0.5 to 10.0 mol % (calculated as Al), the aluminum-containing lithium-iron oxide particles can show a more excellent crystallinity than those having a corrugated layer structure and containing no aluminum, as described in Examples hereinafter. Such aluminum-containing lithium-iron oxide particles having a corrugated layer structure can also show a more excellent electrochemical reversibility due to the more excellent crystallinity. Next, the process for producing lithium-iron oxide particles according to the present invention are described.

The lepidocrocite particles usable in the present invention are represented by the formula of $\gamma\text{-}(Fe_{(1-y)}M_y)OOH$ (wherein $0.005\leq y\leq0.1$, and M is at least one metal selected from the group consisting of cobalt, nickel, manganese and aluminum). The total amount of the one or more metals M contained in the lepidocrocite particles is 0.5 to 10.0 mol % (calculated as Co, Ni, Mn and Al) based on Fe. The average particle size of the lepidocrocite particles is preferably in the range of 0.01 to 1.0 μm, preferably 0.1 to 1.0 μm.

When the total amount of the one or more metals selected from the group consisting of cobalt, nickel, manganese and aluminum, and contained in the lepidocrocite particles is less than 0.5 mol % (calculated as Co, Ni, Mn and Al) based on Fe, it is difficult to obtain the aimed lithium-iron oxide particles which are capable of exhibiting a large diffusion coefficient of lithium ions and are excellent in an electrochemical reversibility of lithium ions. On the other hand, when the total amount of the one or more metals selected from the group consisting of cobalt, nickel and manganese, which is added during the below-mentioned process for the production of lepidocrocite particles, is more than 10.0 mol % (calculated as Co, Ni and Mn) based on Fe, spinel ferrite particles are inevitably produced and mixed with the lepidocrocite particles, so that it becomes difficult to obtain only the lepidocrocite particles containing at least one metal selected from the group consisting of cobalt, nickel and manganese.

In the case where the lepidocrocite particles contain Al as the metal M, lithium-iron oxide particles having a corrugated layer structure with a still higher crystallinity can be obtained.

In this case, the amount of Al contained in the lepidocrocite particles (calculated as atomic ratio "y" in $\gamma\text{-}(Fe_{(1-y)}Al_y)OOH$) is in the range of $0.005\leq y\leq0.1$. When the atomic ratio "y" is less than 0.005, it is difficult to obtain the aimed lithium-iron oxide particles having a corrugated layer structure with a high crystallinity. On the other hand, when the atomic ratio "y" is more than 0.1, goethite particles are inevitably produced during the process for the production of the lepidocrocite particles and mixed with the lepidocrocite particles, so that it becomes difficult to obtain only the Al-containing lepidocrocite particles.

The lepidocrocite particles containing at least one metal selected from the group consisting of cobalt, nickel, manganese and aluminum according to the present invention can be produced by conducting a known method for the production of lepidocrocite in the presence of at least one compound selected from the group consisting of a cobalt compound, a nickel compound, a manganese compound and an aluminum compound.

As the typical method for the production of lepidocrocite particles, there is known a method of oxidizing ferrous hydroxide while passing an oxygen-containing gas such as air through an acidic or neutral suspension containing the ferrous hydroxide.

The lithium compounds used in the present invention may include $Li_2O$, $LiOH$, $LiOH \cdot H_2O$ or the like. In order to inhibit the formation of disordered $\alpha\text{-}LiFeO_2$ and produce only the aimed $Li_x(Fe_{(1-y)}M_y)O_2$ particles (wherein $0<x\leq1$, $0.005\leq y\leq0.1$, and M is at least one metal selected from the group consisting of Co, Ni, Mn and Al), anhydrides of the lithium compounds can be preferably used.

The mixing ratio of the lithium compound particles to the lepidocrocite particles containing at least one metal selected from cobalt, nickel, manganese and aluminum can be determined such that the molar ratio of Li to Fe is preferably not less than 1.2, more preferably not less than 1.4. When the molar ratio of Li to Fe is less than 1.2, rather disordered spinel $\beta\text{-}Li(Fe_{(1-y)}M_y)_5O_8$ (wherein $0.005\leq y\leq0.1$) particles having a low lithium content than the aimed $Li_x(Fe_{(1-y)}M_y)O_2$ particles according to the present invention (wherein $0<x\leq1$, $0.005\leq y\leq0.1$, and M is at least one metal selected from the group consisting of Co, Ni, Mn and Al), are apt to be produced.

When the amount of the lithium compound used considerably exceeds a stoichiometric amount thereof, the lithium compound particles such as lithium hydroxide particles remain unreacted, so that the unreacted lithium compound particles are unsuitably mixed with the aimed $Li_x(Fe_{(1-y)}M_y)O_2$ particles (wherein $0<x\leq1$, $0.005\leq y\leq0.1$, and M is at least one metal selected from the group consisting of Co, Ni, Mn and Al).

The mixed particles of the lepidocrocite particles and the lithium compound particles are heated at a temperature of 100 to 150° C. When the temperature is less than 100° C., the ion exchange reaction speed is decreased, so that the time required for the ion exchange reaction becomes long. On the other hand, when the temperature is more than 150° C., an increased amount of disordered $\alpha\text{-}Li(Fe_{(1-y)}M_y)O_2$ particles (wherein $0.005\leq y\leq0.1$, and M is at least one metal selected from the group consisting of Co, Ni, Mn and Al), which forms a high-temperature stable phase, is unsuitably produced.

As described hereinbefore, when the reaction conditions are out of the range according to the present invention, the unreacted lithium compound particles tend to be unsuitably mixed with the aimed $Li_x(Fe_{(1-y)}M_y)O_2$ particles (wherein $0<x\leq1$, $0.005\leq y\leq0.1$, and M is at least one metal selected from the group consisting of Co, Ni, Mn and Al).

If the $Li_x(Fe_{(1-y)}M_y)O_2$ particles (wherein $0<x\leq1$, $0.005\leq y\leq0.1$, and M is at least one metal selected from the group consisting of Co, Ni, Mn and Al) in which such unreacted lithium compound particles are unsuitably mixed, are used as a material for the cathode active material to form a lithium ion battery, the obtained lithium ion battery have a low capacity because the unreacted lithium compound cannot cause the reversible electrode reaction, thereby lowering the rate of the electrochemical reversible reaction. For this reason, it is important to remove the unreacted lithium compound particles from the aimed lithium-iron oxide particles. In order to remove the unreacted lithium compound particles from the aimed lithium-iron oxide particles, it is preferred that the reaction product particles are suspended in water at a temperature as low as possible, especially not more than 30° C. Thereafter, the unreacted lithium compound particles are removed therefrom, and then the obtained aimed particles are filtered out and dried, as shortly as possible.

The reaction product particles obtained by the aforementioned ion exchange reaction are preferably suspended in water so as to form an aqueous suspension having a concentration of 10 to 50% by weight. When suspended in water, the $Li_x(Fe_{(1-y)}M_y)O_2$ (wherein $0<x\leq 1$, $0.005\leq y\leq 0.1$, and M is at least one metal selected from the group consisting of Co, Ni, Mn and Al) is apt to be decomposed into the lepidocrocite represented by the formula of $\gamma\text{-}(Fe_{(1-y)}M_y)OOH$ (wherein $0.005\leq y\leq 0.1$, and M is at least one metal selected from the group consisting of Co, Ni, Mn and Al). Therefore, it is preferred that the reaction product particles are suspended in cold water having a temperature as low as possible, especially not more than 30° C., so as not to cause the decomposition thereof. Successively, the unreacted lithium compound particles are removed from the reaction product particles and then the obtained aimed particles are filtered out and dried, as shortly as possible. The cold water-washing procedure, and the short filtering and drying procedures can effectively prevent the $Li_x(Fe_{(1-y)}M_y)O_2$ particles (wherein $0<x\leq 1$, $0.005\leq y\leq 0.1$, and M is at least one metal selected from the group consisting of Co, Ni, Mn and Al) from being decomposed.

The drying of the precipitate obtained after suspending the reaction product particles in water and removing the unreacted lithium compound particles such as LiOH by water-washing, is also preferably conducted at a temperature as low as possible, especially at not more than 40° C., and if required, under a reduced pressure. When the drying temperature is more than 40° C., the obtained $Li_x(Fe_{1-y}M_y)O_2$ particles (wherein $0<x\leq 1$, $0.005\leq y\leq 0.1$, and M is at least one metal selected from the group consisting of Co, Ni, Mn and Al) are likely to be decomposed into the lepidocrocite represented by the formula of $\gamma\text{-}(Fe_{(1-y)}M_y)OOH$ (wherein $0.005\leq y\leq 0.1$, and M is at least one metal selected from the group consisting of Co, Ni, Mn and Al).

It is preferred that the obtained lithium-iron oxide particles having a corrugated layer structure according to the present invention, after the afore-mentioned water-washing, and filtering and drying processes, are heat-treated at a temperature of 100 to 250° C. When the temperature is less than 100° C., the aimed lithium-iron oxide particles having the corrugated layer structure and showing an excellent storage stability cannot be obtained. On the other hand, when the temperature is more than 250° C., the lithium-iron oxide particles having the corrugated layer structure undergo change in its crystal structure, thereby unsuitably producing $\alpha Li(Fe_{(1-y)}M_y)OOH$ (wherein $0.005\leq y\leq 0.1$, and M is at least one metal selected from the group consisting of Co, Ni, Mn and Al).

The time required for the heating of the lithium-iron oxide particles is not particularly restricted, but from the standpoints of industrial applicability and economy, the time is preferably 1 to 10 hours, more preferably 1 to 5 hours.

In addition, the dimension of the lithium-iron oxide particles having a corrugated layer structure according to the present invention, can be kept substantially unchanged between before and after heating these particles at a temperature of 100 to 250° C.

Further, the lithium-iron oxide particles having a corrugated layer structure according to the present invention, can also exhibit such an excellent storage stability that an initial crystal structure of the lithium-iron oxide particles can be maintained even after being allowed to stand at room temperature for 96 hours in an atmosphere.

The reason why such $Li_x(Fe_{(1-y)}M_y)O_2$ particles (wherein $0<x\leq 1$, $0.005\leq y\leq 0.1$, and M is at least one metal selected from the group consisting of Co, Ni, Mn and Al), having a corrugated layer structure can be obtained according to the present invention, is considered as follows. That is, the lepidocrocite particles are represented by the formula of $\gamma\text{-}(Fe_{(1-y)}M_y)OOH$ (wherein $0.005\leq y\leq 0.1$, and M is at least one metal selected from the group consisting of Co, Ni, Mn and Al), and have such a crystal structure that protons are contained between the respective layers of the corrugated layer structure. Therefore, in the case where the lepidocrocite particles are heated together with the lithium compound, the ion exchange reaction is caused between protons of the lepidocrocite particles and lithium ions of the lithium compound, so that the lithium ions are introduced into regions between the respective corrugated layers simultaneously with release of the protons therefrom.

The reason why the $Li_x(Fe_{(1-y)}M_y)O_2$ particles (wherein $0<x\leq 1$, $0.005\leq y\leq 0.1$, and M is at least one metal selected from the group consisting of Co, Ni, Mn and Al), having a corrugated layer structure can act as a cathode active material is considered that the lithium ions existing between the respective layers of the corrugated layer structure are caused to be electrochemically introduced thereinto and released therefrom.

In addition, the reason why the obtained $Li_x(Fe_{(1-y)}M_y)O_2$ particles (wherein $0<x\leq 1$, $0.005\leq y\leq 0.1$, and M is at least one metal selected from the group consisting of Co, Ni, Mn and Al), having a corrugated layer structure can provide a high rate of the electrode reaction when used as a cathode active material, may be considered.

That is, the lithium-iron oxide is a mixed conductive material for conducting or transporting both electrons and lithium ions. The electrons are conducted between Fe ions by hopping transfer, while the lithium ions are conducted between ion sites located between the respective $FeO_2$ layers. The electrons are moved so as to be repeatedly introduced into the Fe ions and released therefrom. With such a movement of the electrons, the energy level of the lithium ion sites located close to such Fe ions are varied, so that the probability that the lithium ions occupies the ion sites is also changed. As a result, the electrons and the lithium ions are conducted as if they are coupled with each other in the crystal.

In the case where a part of Fe in the lithium-iron oxide is replaced with at least one metal selected from cobalt, nickel, manganese and aluminum, the electronic structure located near Fermi level becomes changed, so that it is considered that the number of electrons thermally excited to an electronic conduction band is increased. Accordingly, this causes an increased number of electrons to be moved between the Fe ions by hopping transfer, so that the lithium ions are also conducted between the $FeO_2$ layers in association with the movement of the electrons. As a result, the conductivity of the lithium ions can be enhanced. Further, since the electronic conductivity of the lithium-iron oxide is also enhanced, it is possible to increase a rate of the electrode reaction when the lithium-iron oxide is used as an electrode active material.

The reason why the $Li_x(Fe_{(1-y)}Al_y)O_2$ particles (wherein $0<x\leq1$, $0.005\leq y\leq0.1$) can show a still higher crystallinity, may be considered as follows. As described in Comparative Example 1 hereinafter, in the case where the lepidocrocite particles containing no aluminum is used as a raw iron material, there are obtained the $Li_xFeO_2$ particles (wherein $0<x\leq1$) having a low crystallinity. Due to this fact, it is considered that the aluminum contained in the lepidocrocite particles exerts an considerable influence on the crystallinity of the obtained lithium-iron oxide particles.

Specifically, the $Li_x(Fe_{(1-y)}Al_y)O_2$ particles (wherein $0<x\leq1$, $0.005\leq y\leq0.1$) which are produced by using the Al-containing lepidocrocite particles obtained by replacing a part of $Fe^{3+}$ in $\gamma$-FeOOH with $A^{3+}$, have a narrow peak width of a diffracted line in X-ray diffraction pattern, as compared with that of the $Li_xFeO_2$ particles (wherein $0<x\leq1$) which are obtained by using the lepidocrocite particles whose $Fe^{3+}$ is not replaced with $Al^{3+}$. This phenomenon indicates that the crystallinity of the $Li_x(Fe_{(1-y)}Al_y)O_2$ particles is improved.

The reason why the lithium-iron oxide particles having a corrugated layer and showing an excellent storage stability can be obtained may be considered that residual water content or the like is considered to exert an influence on the formation of such lithium-iron oxide particles.

The lithium-iron oxide particles according to the present invention can suitably act as a cathode active material of lithium ion batteries and in addition, can show an excellent electrochemical reversibility due to high crystallinity thereof. Therefore, the lithium-iron oxide particles can be suitably used as a material for such a cathode active material.

Further, the lithium-iron oxide particles according to the present invention does not require the use of a large amount of Co or Ni and, therefore, is inexpensive as compared with $Li_xCoO_2$, $Li_xNiO_2$ or the like. This is advantageous from the standpoints of industrial applications and economy, because such inexpensive lithium-iron oxide particles can be supplied as a material for the cathode active material for lithium ion batteries in an economically large scale.

Furthermore, the lithium-iron oxide particles according to the present invention can exhibit an excellent storage stability and can be readily handled.

EXAMPLES

The present invention is described in more detail by Examples and Comparative Examples, but the Examples are only illustrative and, therefore, not intended to limit the scope of the invention.

Various properties of the lithium-iron oxide particles produced according to the present invention were evaluated by the following methods.

(1) Identification of the reaction product particles, and determination of a crystal structure and a crystallinity thereof were conducted by an X-ray diffractometer (manufactured by RIGAKU CO., LTD.; X-ray used: Mn-filtered Fe K$\alpha$-ray; tube voltage: 40 kV; and tube current: 20 mA).

The crystal structure was determined by comparing the obtained particles with known orthorhombic $Li_xMnO_2$ having a corrugated layer structure.

The crystallinity was determined by a half-peak width of a diffracted line at an interplanar spacing d of 6.07 Å as illustrated in X-ray diffraction pattern. The smaller the half-peak width, the higher the crystallinity becomes.

(2) The amounts of Co, Ni, Mn and Al contained in the lithium-iron oxide particles were measured as follows. That is, the lithium-iron oxide particles were first dissolved in a concentrated hydrochloric acid solution and then the solution was measured by a standard addition method using an inductively-coupled plasma atomic emission spectrometer ICAP-575 (manufactured by Nippon Jarrell-Ash Co., Ltd.). In the afore-mentioned plasma atomic emission spectrometry, only the amounts of lithium, iron, cobalt, nickel, manganese and aluminum were determined with the proviso that it is calculated that two oxygen atoms per $(Fe_{(1-y)}M_y)$ in the lithium-iron oxide particles are contained therein.

(3) The storage stability of the lithium-iron oxide particles was determined as follows. After being allowed to stand at room temperature in an atmosphere for 24 hours, 48 hours, 72 hours and 96 hours, respectively, the crystal structure of the lithium-iron oxide particles were observed by an X-ray diffraction method. The storage stability was indicated by the time at which the crystal structure was initiated to change.

(4) The electrochemical properties of the lithium-iron oxide as an electrode active material were evaluated by a potential sweep method.

Specifically, the lithium-iron oxide particles were mixed with 10 wt % of polyehtylene-tetrafluoride as a binder and 10 wt % of graphite as a conducting agent. 30 mg of the obtained mixture was weighed and filled into a stainless steel mesh as a current collector to form a working electrode for the measurement. Lead terminals made of stainless steel were spot-welded onto the thus-obtained working electrode. In addition, a stainless steel mesh was filled with metal lithium foils to form a counter electrode to which lead terminals were similarly spot-welded. A reference electrode was formed in the same manner as described above using metal lithium.

As an electrolyte, there was used a solution prepared by dissolving lithium perchlorate ($LiClO_4$) in a mixed solvent containing propylene carbonate and dimethoxy ethane in a volume ratio of 1:1, such that the molar concentration of the lithium perchlorate in the solution was 1 mol.

The thus-produced working electrode, counter electrode and reference electrode were immersed in the electrolyte to form a cell for electrochemical measurement. The thus-formed electrochemical cell was applied with a voltage of 1.5 to 3.5 V based on the reference metal lithium electrode to conduct a potential sweep thereof at a sweeping velocity of 10 mV/sec. Upon the potential sweep, observation was made to determine whether or not any change in current was caused. Incidentally, the production of the cell and the electrochemical measurement thereof were conducted in a dry box filled with an argon gas.

The peak value of reduction current appearing in potential-current characteristic curve observed in the afore-mentioned voltage range was used as index of an electrochemical activity of the obtained lithium-iron oxide particles.

Example 1

24.0 g of lepidocrocite ($\gamma$-$(Fe_{(1-y)}Al_y)$OOH) particles containing 3.0 mol % of aluminum and 9.05 g of LiOH (anhydride) particles (Li/Fe=1.4) were mixed with each other. The mixed particles were filled into a pressure bottle closed with a screw cap. The pressure bottle filled with the mixed particles was placed an electric oven which has been preliminarily heated to 130° C. to react the mixed particles for one hour (ion exchange reaction), thereby obtaining a reaction product.

The reaction product was immersed, suspended and washed in 200 cc of cold water of a temperature of about 10° C., for 5 minutes. Successively, the resultant solid precipitate was separated by filtering, and then allowed to stand at 30° C. for 3 days under a reduced pressure for drying to obtain yellowish brown particles.

As is clearly recognized from the X-ray diffraction pattern shown in FIG. 1, it was found that the thus-obtained yellowish brown particles were $Li_x(Fe_{(1-y)}Al_y)O_2$ particles having a corrugated layer structure. Incidentally, in FIG. 1, the peak A indicates $Li_x(Fe_{(1-y)}Al_y)O_2$. In addition, as a result of ICAP analysis, it was confirmed that the particles were $Li_{0.95}Fe_{0.97}Al_{0.03}O_2$ particles having 3.0 mol % of aluminum. As also recognized from the X-ray diffraction pattern shown in FIG. 1, the half-peak width of the diffracted line which was an index for crystallinity of the particles, was 0.44 deg. This indicated that the obtained yellowish brown particles had a high crystallinity.

Figure 2:
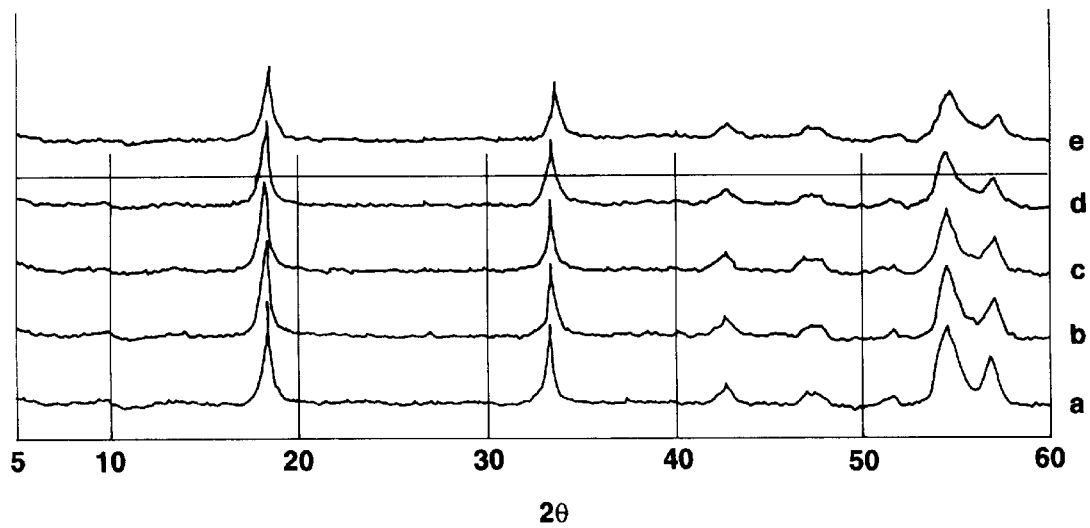
FIG. 2 is graph showing change in X-ray diffraction pattern with the passage of time, of lithium-iron oxide obtained in Example 1.

The obtained yellowish brown particles were then heated at 200° C. in air for 5 hours. A part of the heated yellowish brawn particles were allowed to stand at 25° C. in air to observe a crystal structure thereof. Respective X-ray diffraction patterns obtained 24 hours, 48 hours, 72 hours and 96 hours after the heating, are shown in FIG. 2, wherein curves (a), (b), (c), (d) and (e) indicate the X-ray diffraction patterns obtained 24 hours, 48 hours, 72 hours and 96 hours after the heating, respectively. As is appreciated from FIG. 2, no change in crystal structure of the yellowish brawn particles was recognized even after 96 hours elapsed.

Further, as a result of the electrochemical measurement, it was found that a peak value of reduction current for the electrochemical cell was 15.6 mA in the case where the lithium-iron oxide particles obtained immediately after the ion exchange reaction were used therefor. Also, even in the case where the lithium-iron oxide particles which had been heat-treated at 200° C. and then allowed to stand for 96 hours, were used, the peak value of the reduction current was 15.1 mA. This indicated that substantially no change in electrochemical activity was caused.

Examples 2 to 9 and Comparative Examples 1 to 4

The same procedure as defined in Example 1 was conducted except that the molar ratio of the lithium compound to the lepidocrocite particles (Li/Fe) and the heating temperatures were changed variously, to produce reaction products.

The particles obtained by heat-treating the thus-obtained reaction products while changing the heating temperature and the heating time variously, were observed by X-ray diffraction method to determine a storage stability thereof.

The lithium-iron oxide particles obtained immediately after the ion exchange reaction and those obtained after subjected to the heat-treatment and the storage for 96 hours were electrochemically observed to measure the peak values of the respective reduction currents therefor.

The production conditions, various properties of the reaction products and properties of the heat-treated products are shown in Table 1.

TABLE 1

| Examples and Comparative Examples | Production of lithium-iron oxide particles | | | |
|---|---|---|---|---|
| | γ-FeOOH Al content (mol %) | Lithium compound Kind | Ratio of Li/Fe (molar ratio) | Heating temperature (° C.) |
| Example 2 | 5.0 | LiOH | 1.4 | 130 |
| Example 3 | 1.0 | LiOH | 1.4 | 130 |
| Example 4 | 8.5 | LiOH | 1.4 | 130 |
| Example 5 | 5.0 | LiOH | 1.2 | 130 |
| Example 6 | 5.0 | LiOH | 1.4 | 110 |
| Example 7 | 5.0 | LiOH | 1.4 | 145 |
| Example 8 | — | LiOH | 1.4 | 110 |
| Example 9 | — | LiOH | 1.4 | 145 |
| Comparative Example 1 | — | LiOH | 1.4 | 130 |
| Comparative Example 2 | — | LiOH | 1.4 | 80 |
| Comparative Example 3 | — | LiOH | 1.4 | 180 |
| Comparative Example 4 | — | LiOH | 1.0 | 130 |

| Examples and Comparative Examples | Production of lithium-iron oxide particles | | Half-peak width of the diffracted line |
|---|---|---|---|
| | Kind of products | | |
| | Crystal structure | Composition | |
| Example 2 | Corrugated layer structure | $Li_{0.96}Fe_{0.95}Al_{0.05}O_2$ | 0.39 |
| Example 3 | Corrugated layer structure | $Li_{0.92}Fe_{0.99}Al_{0.01}O_2$ | 0.44 |
| Example 4 | Corrugated layer structure | $Li_{0.90}Fe_{0.915}Al_{0.085}O_2$ | 0.45 |
| Example 5 | Corrugated layer structure | $Li_{0.95}Fe_{0.95}Al_{0.05}O_2$ | 0.49 |
| Example 6 | Corrugated layer structure | $Li_{0.90}Fe_{0.95}Al_{0.05}O_2$ | 0.42 |
| Example 7 | Corrugated layer structure | $Li_{0.99}Fe_{0.95}Al_{0.05}O_2$ | 0.40 |
| Example 8 | Corrugated layer structure | $Li_{0.90}Fe_{1.0}O_2$ | 0.57 |
| Example 9 | Corrugated layer structure | $Li_{0.99}Fe_{1.0}O_2$ | 0.57 |
| Comparative Example 1 | Corrugated layer structure | $Li_{0.93}Fe_{1.0}O_2$ | 0.57 |
| Comparative Example 2 | Mixed phase | $Li_xFeO_2$, γ-FeOOH and α-LiFeO$_2$ | — |
| Comparative Example 3 | Mixed phase | $Li_xFeO_2$ and α-LiFeO$_2$ | — |
| Comparative Example 4 | Mixed phase | $Li_xFeO_2$, γ-FeOOH and β-LiFe$_5$O$_8$ | — |

| Examples and Comparative Examples | Storage stability | | | |
|---|---|---|---|---|
| | Post-treatment process Heat treatment | | Passage of time up to initiation of change in crystal structure | Reduction current immediately after ion exchange reaction (mA) | Reduction current after stored for 96 hours (mA) |
| | Temperature (° C.) | Time (hour) | | | |
| Example 2 | 200 | 5 | No change in crystal structure occurred | 15.3 | 15.1 |
| Example 3 | 200 | 1 | | 16.0 | 15.6 |
| Example 4 | 150 | 10 | | 15.8 | 15.7 |
| Example 5 | 150 | 5 | | 15.1 | 14.7 |
| Example 6 | 200 | 10 | | 14.7 | 14.4 |
| Example 7 | 130 | 10 | | 15.2 | 13.9 |
| Example 8 | 180 | 5 | | 13.8 | 13.4 |
| Example 9 | 150 | 10 | | 14.6 | 14.5 |

TABLE 1-continued

| | | | | | |
|---|---|---|---|---|---|
| Comparative Example 1 | — | — | Change in crystal structure was recognized only after 24 hours elapsed even after 96 hours elapsed | 13.2 | 7.2 |
| Comparative Example 2 | — | — | | 13.7 | 7.8 |
| Comparative Example 3 | — | — | | 14.4 | 8.0 |
| Comparative Example 4 | — | — | | 12.9 | 6.6 |

Figure 3:
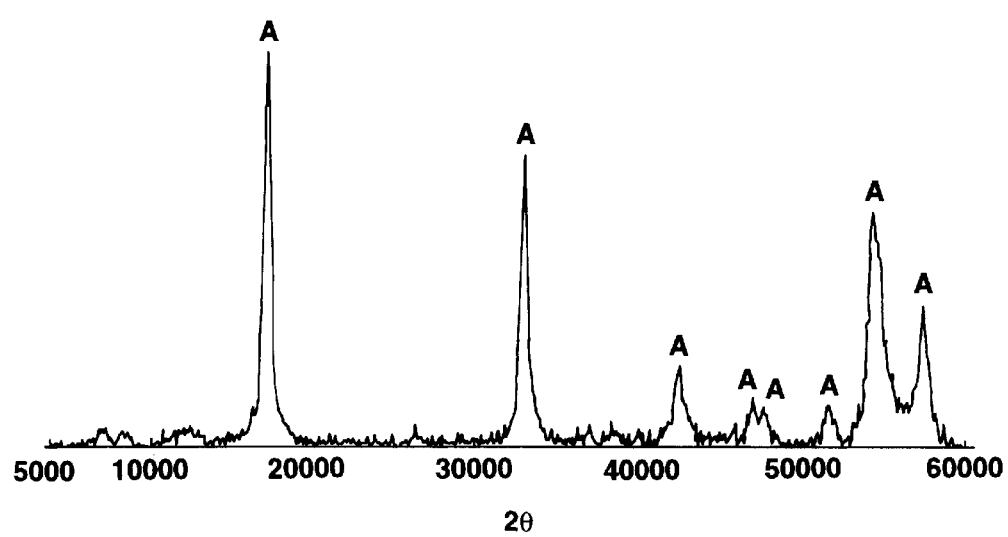
FIG. 3 is a graph showing an X-ray diffraction pattern of lithium-iron oxide obtained in Example 8.

As a result of X-ray diffraction analysis, it was found that all of the lithium-iron oxide particles obtained in Examples 2 to 9 had a composition of $Li_x(Fe_{(1-y)}M_y)O_2$ ($0<x\leq1$, $0.005\leq y\leq0.1$, and M is at least one metal selected from the group consisting of Co, Ni, Mn and Al) having a corrugated layer structure, and were excellent in storage stability. Further, it was recognized that the aluminum-containing lithium-iron oxide particles obtained in Examples 2 to 7 had a smaller half-peak width of the diffracted line and, therefore, exhibited a higher crystallinity than those obtained in Examples 8 and 9 which contained no aluminum. Meanwhile, the X-ray diffraction pattern of the lithium-iron oxide particles obtained in Example 8 is shown in FIG. 3.

Figure 9:
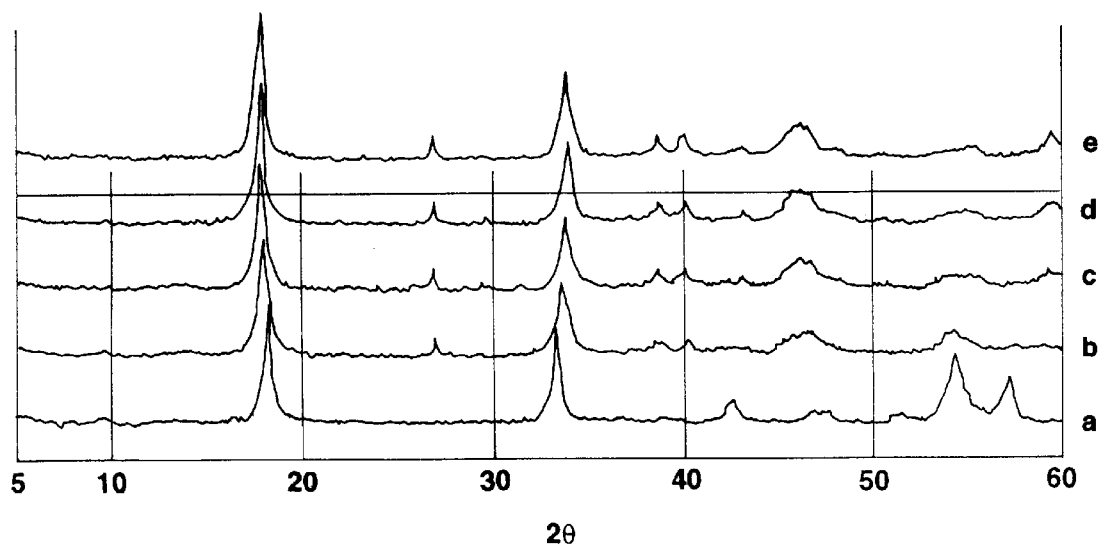
FIG. 9 is graph showing change in X-ray diffraction pattern with the passage of time, of lithium-iron oxide obtained in Comparative Example 1.

The X-ray diffraction pattern of the lithium-iron oxide particles obtained in Comparative Example 1 is shown in FIG. 9, wherein curves (a), (b), (c), (d) and (e) indicate the X-ray diffraction patterns obtained 24 hours, 48 hours, 72 hours and 96 hours after the heating, respectively. As is clearly recognized from the comparison between the curves (a) and (b), the lithium-iron oxide particles obtained in Comparative Example 1 already underwent change in crystal structure thereof only after 24 hours elapsed.

Figure 10:
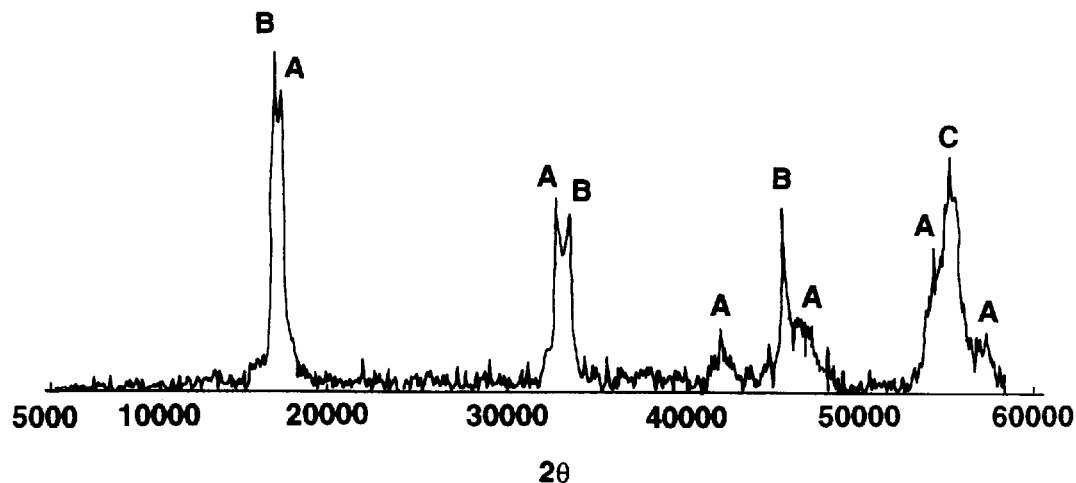
FIG. 10 is a graph showing an X-ray diffraction pattern of lithium-iron oxide obtained in Comparative Example 2.

As is recognized from the X-ray diffraction patterns shown in FIG. 10, the yellowish brown particles obtained in Comparative Example 2 were found to be a mixture of $Li_xFeO_2$ having a corrugated layer structure, $\gamma$-FeOOH and $\alpha$-$Li_xFeO_2$. In FIG. 10, the peaks A, B and C indicate $Li_xFeO_2$, $\gamma$-FeOOH and $\alpha$-$Li_xFeO_2$, respectively.

Figure 11:
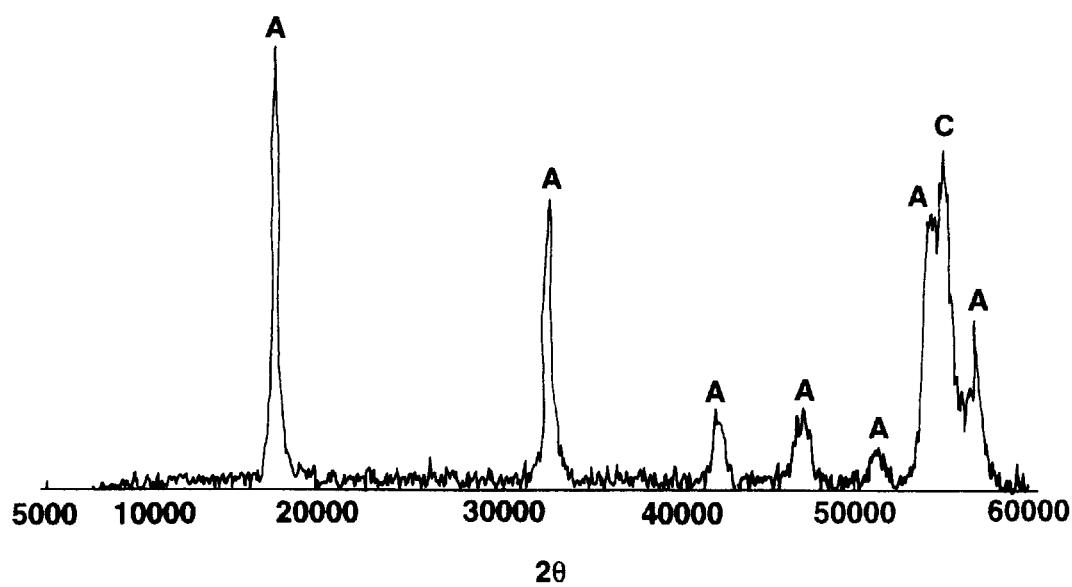
FIG. 11 is a graph showing an X-ray diffraction pattern of lithium-iron oxide obtained in Comparative Example 3.

In addition, as is recognized from the X-ray diffraction patterns shown in FIG. 11, the yellowish brawn particles obtained in Comparative Example 3 were found to be a mixture of $Li_xFeO_2$ having a corrugated layer structure and $\alpha$-$Li_xFeO_2$. In FIG. 11, the peaks A and C indicate $Li_xFeO_2$ and $\alpha$-$Li_xFeO_2$, respectively.

Figure 12:
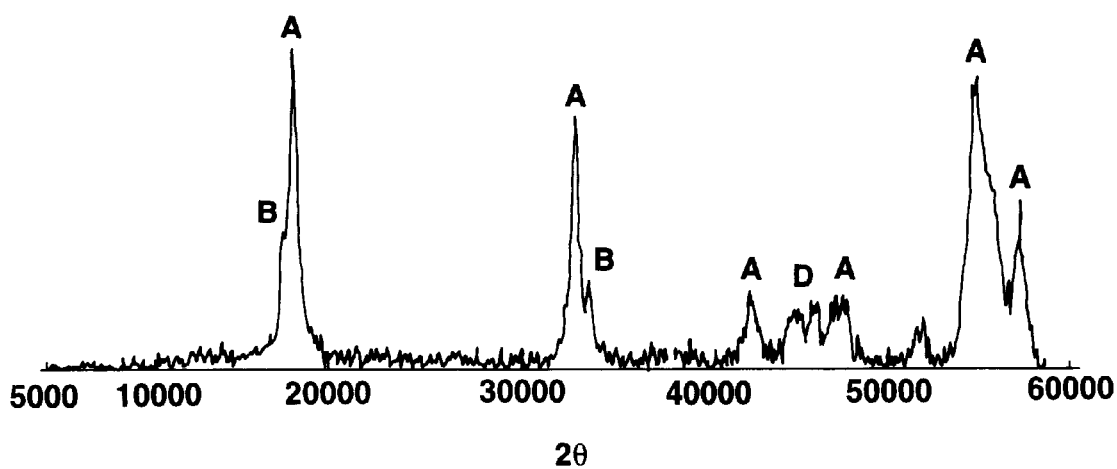
FIG. 12 is a graph showing an X-ray diffraction pattern of lithium-iron oxide obtained in Comparative Example 4.

Further, as is recognized from the X-ray diffraction patterns shown in FIG. 12, the yellowish brawn particles obtained in Comparative Example 4 were found to be a mixture of $Li_xFeO_2$ having a corrugated layer structure, $\gamma$-FeOOH and $LiFe_5O_8$. In FIG. 12, the peaks A, B and D indicate $Li_xFeO_2$, $\gamma$-FeOOH and $\beta$-$LiFe_5O_8$, respectively.

The preferable difference between the reduction current immediately after ion-exhanfe reaction and the reduction current after stored for 96 hours of the lithium-iron oxide particles according to the present invention is not more than 2.0 mA.

Example 10

24.0 g of lepidocrocite ($\gamma$-$(Fe_{(1-y)}Co_y)OOH$) particles containing 3.0 mol % of cobalt and 9.05 g of LiOH (anhydride) particles (Li/Fe=1.4) were mixed with each other. The mixed particles were filled into a pressure bottle closed with a screw cap. The pressure bottle filled with the mixed particles was placed an electric oven which has been preliminarily heated to 130° C., to react the mixed particles for one hour, thereby obtaining a reaction product.

The reaction product was immersed, suspended and washed in 200 cc of cold water of a temperature of about 10° C., for 5 minutes. Successively, the resultant solid precipitate was separated by filtering, and then allowed to stand at 30° C. for 3 days under a reduced pressure for drying to obtain yellowish brown particles.

Figure 4:
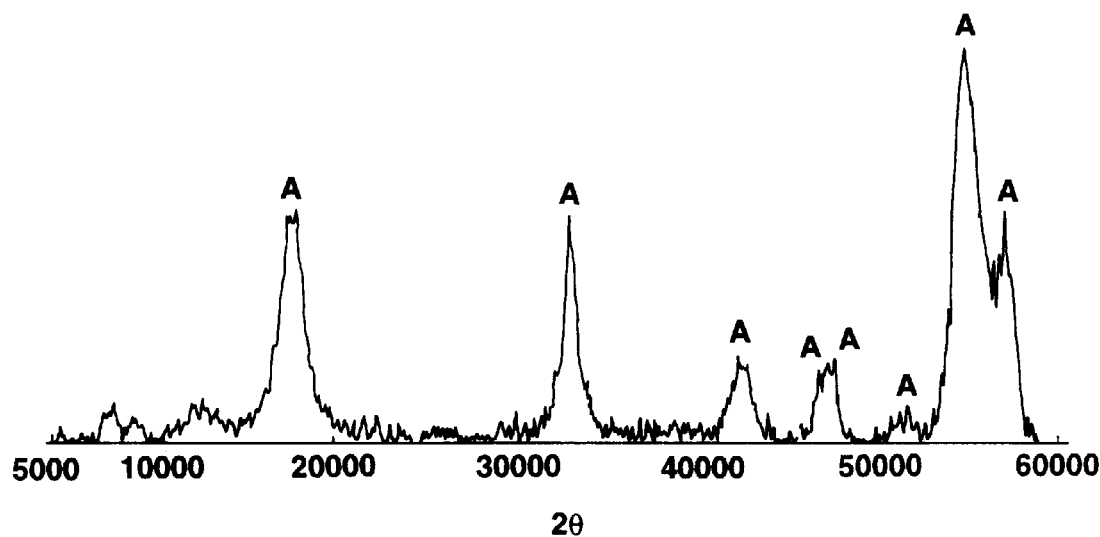
FIG. 4 is a graph showing an X-ray diffraction pattern of lithium-iron oxide obtained in Example 10.

As is clearly recognized from the X-ray diffraction pattern shown in FIG. 4, it was found that the thus-obtained yellowish brown particles were $Li_x(Fe_{(1-y)}Co_y)O_2$ particles having a corrugated layer structure. Incidentally, in FIG. 4, the peak A indicates $Li_x(Fe_{(1-y)}Co_y)O_2$. In addition, as a result of ICAP analysis, it was confirmed that the yellowish brown particles were $Li_{0.95}Fe_{0.97}Co_{0.03}O_2$ particles having 3.0 mol % of cobalt.

The thus-produced lithium-iron oxide particles were subjected to the potential sweep process, so that it was found that the peak value of the reduction current was 22.3 mA.

Examples 11 to 16

The same procedure as defined in Example 10 was conducted except that the molar ratio of the lithium compound to the lepidocrocite particles (Li/Fe) and the heating temperatures were changed variously, to produce reaction products.

The production conditions, various properties of the reaction products and properties of the heat-treated products are shown in Table 2.

TABLE 2

Production of lithium-iron oxide particles

| | Lepidocrocite | | Lithium compound Kind | Ratio of Li/Fe (molar ratio) | Heating temperature (°C.) |
|---|---|---|---|---|---|
| Examples | Kind of M elements | Content of M (mol %) | | | |
| Example 11 | Co | 1.0 | LiOH | 1.4 | 130 |
| Example 12 | Co | 8.5 | LiOH | 1.4 | 130 |
| Example 13 | Ni | 5.5 | LiOH | 1.4 | 130 |
| Example 14 | Mn | 4.0 | LiOH | 1.4 | 130 |
| Example 15 | Co | 5.0 | LiOH | 1.4 | 110 |
| Example 16 | Co | 5.0 | LiOH | 1.2 | 145 |
| Comparative Example 1 | — | — | LiOH | 1.4 | 130 |
| Comparative Example 2 | — | — | LiOH | 1.4 | 80 |
| Comparative Example 3 | — | — | LiOH | 1.4 | 180 |
| Comparative Example 4 | — | — | LiOH | 1.0 | 130 |

Production of lithium-iron oxide particles

| | Kind of products | | Peak value of reduction current after stored for hours (mA) |
|---|---|---|---|
| Examples | Crystal structure | Composition | |
| Example 11 | Corrugated layer structure | $Li_{0.95}Fe_{0.99}Co_{0.01}O_2$ | 20.7 |

TABLE 2-continued

| | | | |
|---|---|---|---|
| Example 12 | Corrugated layer structure | $Li_{0.91}Fe_{0.915}Co_{0.085}O_2$ | 23.4 |
| Example 13 | Corrugated layer structure | $Li_{0.90}Fe_{0.945}Ni_{0.055}O_2$ | 20.3 |
| Example 14 | Corrugated layer structure | $Li_{0.93}Fe_{0.96}Mn_{0.04}O_2$ | 18.8 |
| Example 15 | Corrugated layer structure | $Li_{0.90}Fe_{0.95}Co_{0.05}O_2$ | 23.2 |
| Example 16 | Corrugated layer structure | $Li_{0.98}Fe_{0.95}Co_{0.05}O_2$ | 24.1 |
| Comparative Example 1 | Corrugated layer structure | $Li_{0.93}Fe_{1.0}O_2$ | 13.2 |
| Comparative Example 2 | Mixed phase | $Li_xFeO_2$, $\gamma$-FeOOH and $\alpha$-LiFeO$_2$ | 13.7 |
| Comparative Example 3 | Mixed phase | $Li_xFeO_2$ and $\alpha$-LiFeO2 | 14.4 |
| Comparative Example 4 | Mixed phase | $Li_xFeO_2$, $\gamma$-FeOOH and $\beta$-LiFeO$_2$ | 12.9 |

Figure 5:
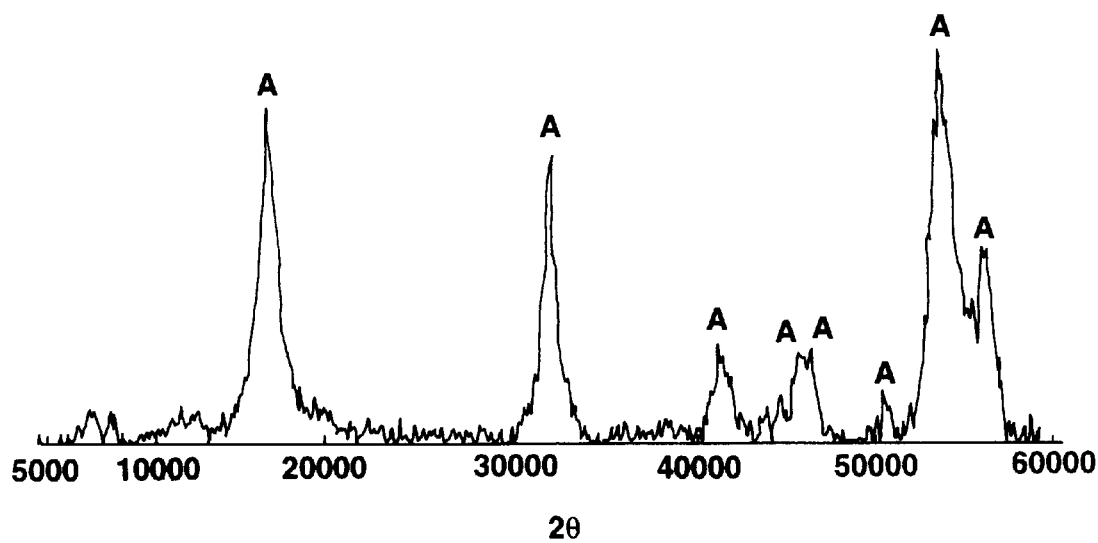
FIG. 5 is a graph showing an X-ray diffraction pattern of lithium-iron oxide obtained in Example 13.

As a result of X-ray diffraction analysis, it was found that all of the lithium-iron oxide particles obtained in Examples 11 to 16 had a composition of $Li_x(Fe_{(1-y)}M_y)O_2$ ($0<x\leq 1$, $0.005\leq y \leq 0.1$ and M is Co, Ni or Mn) having a corrugated layer structure. Meanwhile, the X-ray diffraction pattern of the lithium-iron oxide particles obtained in Example 13 is shown in FIG. 5.

The preferable peak value of the reduction current of the lithium-iron oxide particles according to the present invention is not less than 16.0 mA.

Example 17

24.0 g of lepidocrocite ($\gamma$-$(Fe_{(1-y)}Al_y)$OOH) particles containing 3.0 mol % of aluminum and 9.05 g of LiOH (anhydride) (Li/Fe=1.4) were mixed with each other. The mixed particles were filled into a pressure bottle closed with a screw cap. The pressure bottle filled with the mixed particles was placed an electric oven which has been preliminarily heated to 130° C. to react the mixed particles for one hour, thereby obtaining a reaction product.

The reaction product was immersed, suspended and washed in 200 cc of cold water having a temperature of about 10° C., for 5 minutes. Successively, the resultant solid precipitate was separated by filtering, and then allowed to stand at 30° C. for 3 days under a reduced pressure for drying to obtain yellowish brown particles.

Figure 6:
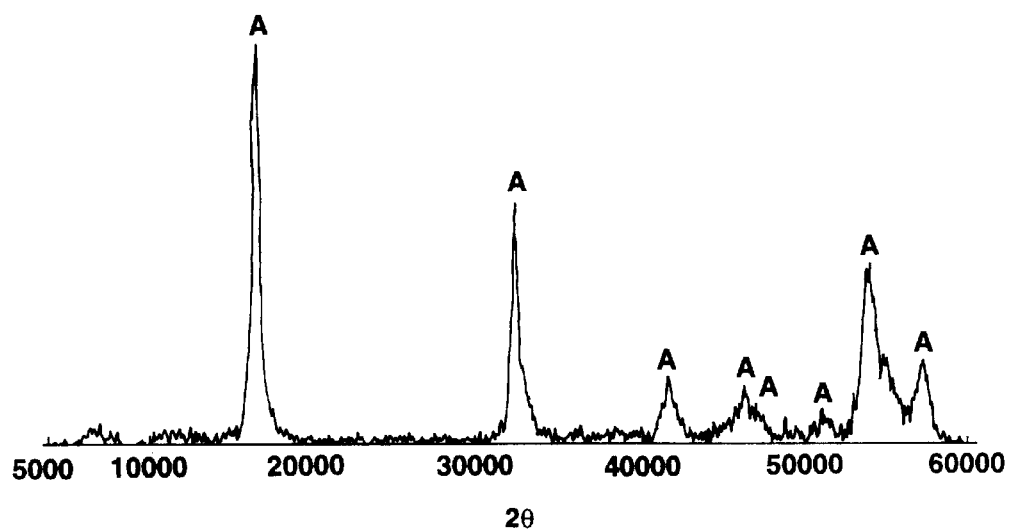
FIG. 6 is a graph showing an X-ray diffraction pattern of lithium-iron oxide obtained in Example 17.

As is clearly recognized from the X-ray diffraction pattern shown in FIG. 6, it was found that the thus-obtained yellowish brown particles were $Li_x(Fe_{(1-y)}Al_y)O_2$ particles having a corrugated layer structure. Incidentally, in FIG. 6, the peak A was $Li_x(Fe_{(1-y)}Al_y)O_2$. In addition, as a result of ICAP analysis, it was confirmed that the particles were $Li_{0.95}Fe_{0.97}Al_{0.03}O_2$ particles having 3.0 mol % of aluminum. As is also recognized from the X-ray diffraction pattern shown in FIG. 6, the half-peak width of the diffracted line which was an index for crystallinity of the particles, was 0.44 deg. This indicated that the obtained yellowish brawn particles had a high crystallinity.

From the potential-current characteristic curve recorded by subjecting the $Li_{0.95}Fe_{0.97}Al_{0.03}O_2$ particles to a potential sweep process, it was found that the ratio of oxidation electrical quantity to reduction electrical quantity was 86%.

Examples 18 to 23

The same procedure as defined in Example 17 was conducted except that the molar ratio of the lithium compound to the lepidocrocite particles (Li/Fe) and the heating temperatures were changed variously, to produce reaction products.

The production conditions, various properties of the reaction products and properties of the heat-treated products are shown in Table 3.

TABLE 3

| | Production of lithium-iron oxide particles | | | |
|---|---|---|---|---|
| Examples | Aluminum-containing $\gamma$-FeOOH Al content (mol %) | Lithium compound Kind | Ratio of Li/Fe (molar ratio) | Heating temperature (° C.) |
| Example 18 | 5.0 | LiOH | 1.4 | 130 |
| Example 19 | 1.0 | LiOH | 1.4 | 130 |
| Example 20 | 8.5 | LiOH | 1.4 | 130 |
| Example 21 | 5.0 | LiOH | 1.2 | 130 |
| Example 22 | 5.0 | LiOH | 1.4 | 110 |
| Example 23 | 5.0 | LiOH | 1.4 | 145 |
| Comparative Example 1 | — | LiOH | 1.4 | 130 |
| Comparative Example 2 | — | LiOH | 1.4 | 80 |
| Comparative Example 3 | — | LiOH | 1.4 | 180 |
| Comparative Example 4 | — | LiOH | 1.0 | 130 |

| | Production of lithium-iron oxide particles | | | |
|---|---|---|---|---|
| | Kind of products | | Half-peak width of the diffracted line (deg) | Oxidative electrical quantity/reductive electrical quantity (%) |
| Examples | Crystal structure | Composition | | |
| Example 18 | Corrugated layer structure | $Li_{0.96}Fe_{0.95}Al_{0.05}O_2$ | 0.39 | 89 |
| Example 19 | Corrugated layer structure | $Li_{0.92}Fe_{0.99}Al_{0.01}O_2$ | 0.44 | 85 |
| Example 20 | Corrugated layer structure | $Li_{0.90}Fe_{0.915}Al_{0.085}O_2$ | 0.45 | 82 |
| Example 21 | Corrugated layer structure | $Li_{0.95}Fe_{0.95}Al_{0.05}O_2$ | 0.49 | 80 |
| Example 22 | Corrugated layer structure | $Li_{0.90}Fe_{0.95}Al_{0.05}O_2$ | 0.42 | 86 |
| Example 23 | Corrugated layer structure | $Li_{0.99}Fe_{0.95}Al_{0.05}O_2$ | 0.40 | 88 |
| Comparative Example 1 | Corrugated layer structure | $Li_{0.93}Fe_{1.0}O_2$ | 0.57 | 67 |
| Comparative Example 2 | Mixed phase | $Li_xFeO_2$, $\gamma$-FeOOH and $\alpha$-LiFeO$_2$ | — | 75 |
| Comparative Example 3 | Mixed phase | $Li_xFeO_2$ and $\alpha$-LiFeO$_2$ | — | 79 |
| Comparative Example 4 | Mixed phase | $Li_xFeO_2$, $\gamma$-FeOOH and $\beta$-LiFeO$_2$ | — | 72 |

As a result of X-ray diffraction analysis, it was found that all of the lithium-iron oxide particles obtained in Examples 18 to 23 had a composition of $Li_x(Fe_{(1-y)}Al_y)O_2$ ($0<x\leq 1$, $0.005\leq y\leq 0.1$) having a corrugated layer structure. In addition, as a result of X-ray diffraction analysis therefor, it was found that the half-peak widths of the diffracted line which were an index for crystallinity of the particles, were small. This indicated that these particles had a high crystallinity.

Figure 7:
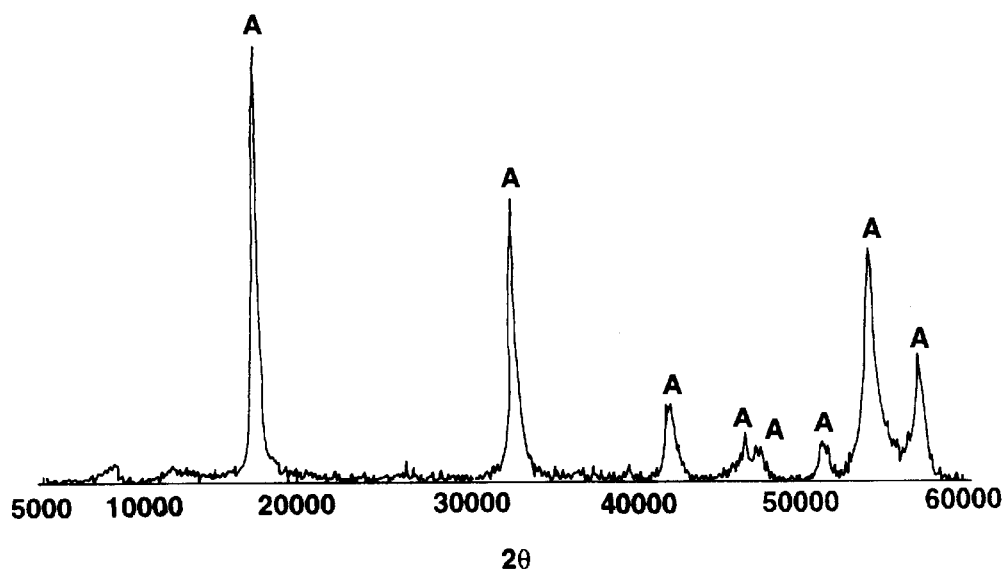
FIG. 7 is a graph showing an X-ray diffraction pattern of lithium-iron oxide obtained in Example 18.
Figure 8:
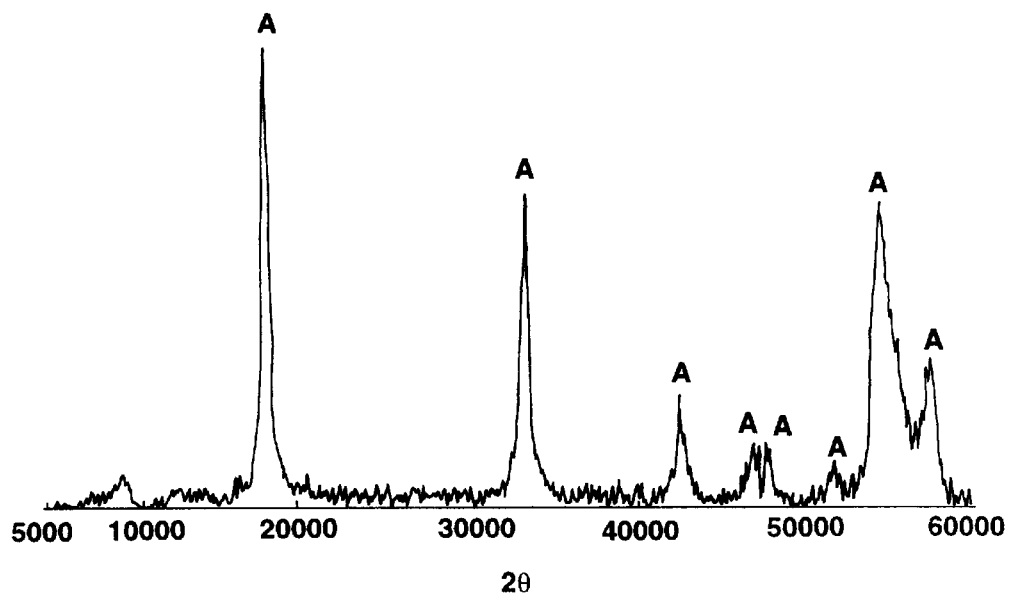
FIG. 8 is a graph showing an X-ray diffraction pattern of lithium-iron oxide obtained in Example 20.

Meanwhile, the X-ray diffraction patterns of the lithium-iron oxide particles obtained in Examples 18 and 20 are shown in FIGS. 7 and 8, respectively. In FIGS. 7 and 8, the peak A indicate $Li_x(Fe_{(1-y)}Al_y)O_2$.

The preferable ratio of the oxidation electrical quantity to the reduction electical quantity is not less than 80%.

Application Example

The lithium-iron oxide particles obtained in Examples 2 to 9, 11 to 16 and 18 to 23 and Comparative Examples 1 to 4 were measured in the same manner as in Example 1 to determine electrochemical properties thereof, i.e., suitability as a material for the cathode active material.

As a result of the measurement, it was found that the lithium-iron oxide particles obtained in Examples 2 to 9 showed no considerable change in peak value of the reduction current between before and after the storage thereof, while the lithium-iron oxide particles obtained in Comparative Examples 1 to 4 showed drastic decrease in peak value of the reduction current during the storage and, therefore, were found to be deteriorated in electrochemical activity thereof.

As described above, it was recognized that the lithium-ion oxide particles produced according to the present invention were free from unsuitable change in crystal structure, and had an excellent storage stability. Further, it was found that if required, by incorporating aluminum in the particles, there could be obtained the Al-containing lithium-iron oxide particles having a still higher crystallinity.

The peak values of the reduction currents of the lithium-iron oxide particles obtained in Examples 11 to 16 were measured in the same manner as in Example 10. The results are shown in Table 2 above.

As is clearly noticeable from Table 2, it was found that the peak values of the reduction currents of the lithium-iron oxide particles obtained in Examples 11 to 16 were large as compared to those of Comparative Examples 1 to 4, and, therefore, the lithium-iron oxide particles according to the present invention could provide a higher rate of electrode reaction.

Incidentally, in the above Application Example using the lithium-iron oxide particles of Examples 11 to 16, there was explained the case where the lithium-iron oxide particles produced by using lithium hydroxide anhydride as the lithium compound were applied as the material for the cathode active material. However, in accordance with the present invention, it was recognized that when lithium hydroxide hydride, lithium peroxide or the like was used as the lithium compound, the same effects as above could be obtained.

Further, it was recognized that when the lithium-iron oxide particles containing Co and Ni, Co and Mn, or Co, Ni and Mn in combination were used as the material for the cathode active material, the same high rate of electrode reaction as in Examples 11 to 16 could be obtained.

Similarly, when the lithium-iron oxide particles obtained in Examples 18 to 23 were used, the ratios of oxidation electrical quantity to reduction electrical quantity were as high as near 100% as compared with those of Comparative Examples 1 to 4. Accordingly, it was found that the lithium-iron oxide particles produced according to the present invention could show a more excellent electrochemical reversibility.

As described above, in accordance with the present invention, it was found that lithium-iron oxide particles having an excellent electrochemical reversibility could be obtained due to the higher crystallinity thereof.

Meanwhile, in the above Application Example using the lithium-iron oxide particles of Examples 18 to 23, it was also recognized that when lithium hydroxide hydride, lithium oxide, lithium peroxide or the like was used as the lithium compound, the same excellent effects as above could be obtained.

What is claimed is:

1. Lithium-iron oxide particles having a corrugated layer crystal structure and represented by the general formula (1):

$$Li_x(Fe_{(1-y)}M_y)O_2 \qquad (1)$$

wherein x is more than 0 and not more than 1; y is 0.005 to 0.1; and M is at least one metal selected from the group consisting of Co, Ni, Mn and Al.

2. Lithium-iron oxide particles according to claim 1, which further have a particle size of 0.01 to 1.0 μm.

3. Lithium-iron oxide particles according to claim 1, which are produced by the step of heating mixed particles of lepidocrocite particles containing at least one metal selected from the group consisting of cobalt, nickel, manganese and aluminum, and lithium compound particles, at a temperature of 100 to 150° C.

4. Lithium-iron oxide particles according to claim 3, which are produced by the further step of heat-treating the obtained, dried particles at a temperature of 100 to 250° C.

5. Lithium-iron oxide particles having a corrugated layer crystal structure and represented by the general formula (2):

$$Li_x(Fe_{(1-y)}Al_y)O_2 \qquad (2)$$

wherein x is more than 0 and not more than 1 and y is 0.005 to 0.1.

6. Lithium-iron oxide particles according to claim 5, which are produced by the step of heating mixed particles of lepidocrocite particles containing aluminum, and lithium compound particles, at a temperature of 100 to 150° C.

7. Lithium-iron oxide particles according to claim 6, which are produced by the further step of heat-treating the obtained, dried particles at a temperature of 100 to 250° C.

8. A process for producing the lithium-iron oxide particles having a corrugated layer crystal structure and represented by the general formula (1):

$$Li_x(Fe_{(1-y)}M_y)O_2 \qquad (1)$$

wherein x is more than 0 and not more than 1; y is 0.005 to 0.1; and M is at least one metal selected from the group consisting of Co, Ni, Mn and Al, which comprises the step of heating mixed particles of lepidocrocite particles containing at least one metal selected from the group consisting of cobalt, nickel, manganese and aluminum, and lithium compound particles, at a temperature of 100 to 150° C.

9. A process for producing the lithium-iron oxide particles having a corrugated layer crystal structure and represented by the general formula (3):

$$Li_xFeO_2 \qquad (3)$$

wherein x is more than 0 and not more than 1, which comprises the steps of heating mixed particles of lepidocrocite particles and lithium compound particles at a temperature of 100 to 150° C., and after drying the lithium-iron oxide particles, heat-treating the dried particles at a temperature of 100 to 250° C.

* * * * *